United States Patent [19]

Stafford

[11] 4,184,143
[45] Jan. 15, 1980

[54] SEISMIC SIGNAL CONDUCTOR TESTING SYSTEM

[75] Inventor: Joseph D. Stafford, Bellaire, Tex.

[73] Assignee: Texaco Inc., White Plains, N.Y.

[21] Appl. No.: 911,563

[22] Filed: Jun. 1, 1978

[51] Int. Cl.² .................. G01V 1/38; G01R 31/02
[52] U.S. Cl. ............................... 367/13; 340/562; 324/51; 179/175.3 R
[58] Field of Search ............ 340/3 T, 5 C, 7 R, 562, 340/509, 513; 73/1 DV; 324/51, 52; 179/175.3 F, 175.3 R; 178/69 G, 71 T

[56] References Cited

U.S. PATENT DOCUMENTS

| B 534,767 | 2/1976 | Vaiden | 324/51 |
|---|---|---|---|
| 3,686,667 | 8/1972 | Schulg | 340/513 |
| 3,818,329 | 6/1974 | Reaves | 324/66 |
| 3,849,772 | 11/1974 | Burnett | 324/51 |
| 3,858,169 | 12/1974 | Bardeen | 340/5 C |
| 4,134,099 | 1/1979 | Lankford | 340/15.5 TS |

FOREIGN PATENT DOCUMENTS 197707  5/1977  U.S.S.R. ................... 179/175.3 F

*Primary Examiner*—Nelson Moskowitz
*Attorney, Agent, or Firm*—Robert A. Kulason; Carl G. Ries; Henry C. Dearborn

[57] ABSTRACT

In a conductor cable for seismic exploration, where the cable will have very high resistance transducers connected to it for transmitting signals from one or more transducer stations to a recording station, there is a controllably conductive path connected across the transducers. The path is only conductive at a voltage greater than the maximum of the signals. And, a constant current source is applied at the recording station. Also, a voltmeter is employed to measure the continuity of the cable.

8 Claims, 3 Drawing Figures

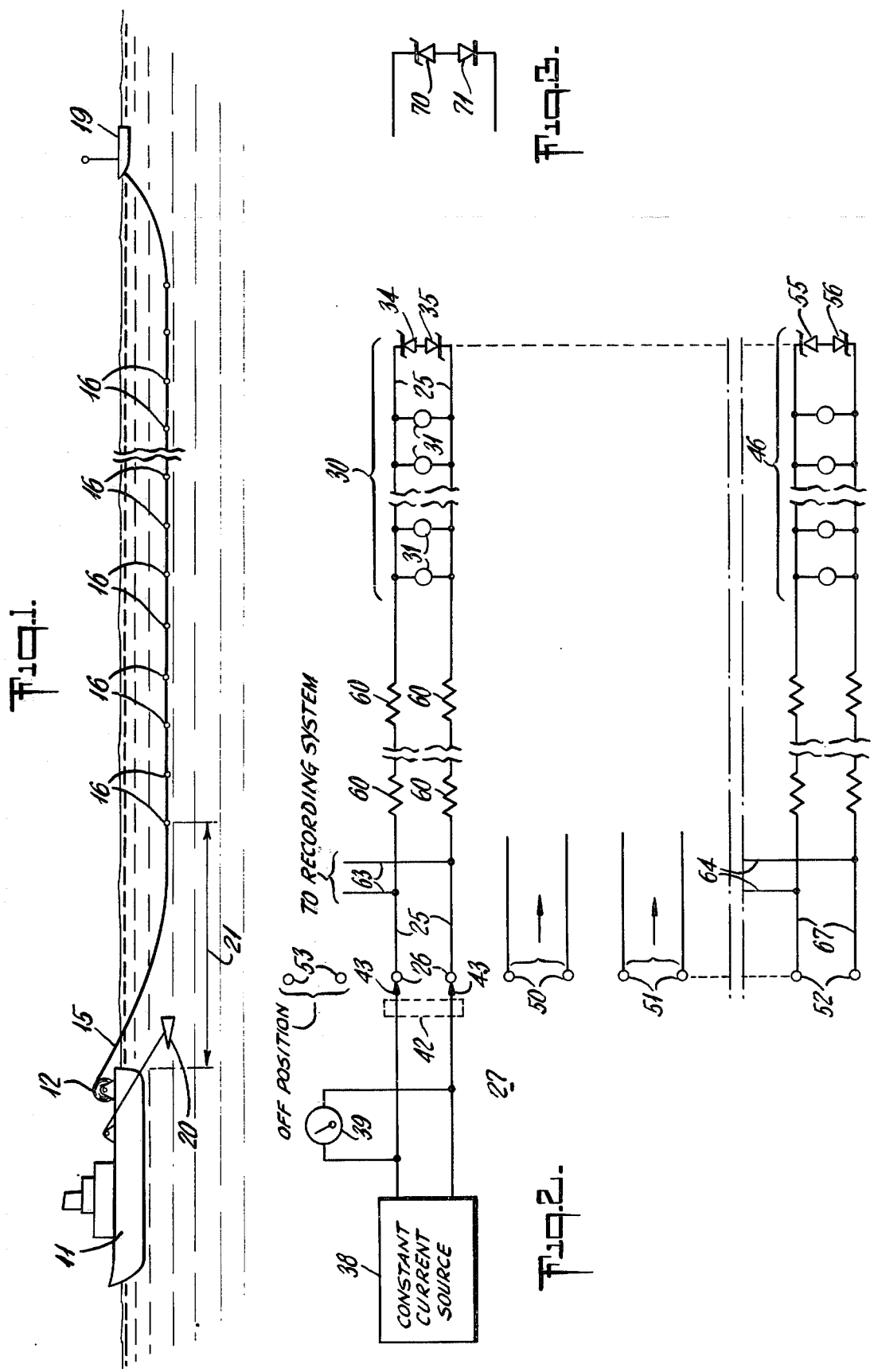

SEISMIC SIGNAL CONDUCTOR TESTING SYSTEM

BACKGROUND OF THE INVENTION

1. Field of the Invention

This invention concerns seismic exploration, in general. More specifically, it deals with a system for testing seismic signal conductors. And, it is particularly applicable to such conductor systems wherein the transducers are very high resistance type, e.g. crystal hydrophones.

2. Description of the Prior Art

In connection with seismic exploration operations, it has been common practice (particularly in land operations) to make use of an ohmeter to test for continuity by switching to the separate geophone circuits in the cables that extend from a recording station of each of the geophone, or transducer, stations. This permitted a rapid continuity check in order to determine whether the geophones were properly connected and/or the cable was not broken. This was quite effective because the resistance of the geophone or geophones was a known quantity, and consequently an open circuit from the causes mentioned (or otherwise) would be quickly indicated. However, in marine seismic operations, the geophones employed are ordinarily crystal hydrophone type instruments and consequently the resistance of these hydrophones is so high that it would indicate the same as an open circuit. Consequently, a continuity check of the type just indicated above, has not been feasible except by making use of individual transformers loated close to the hydrophones. And, a rapid and useful continuity check has not been possible without such transformers. But, by adding a simple unit at each of the geophone stations in accordance with this invention, a continuity check similar to that previously practiced on land seismic operations (with geophones having a normal resistance characteristic) may be carried out.

Thus, it is an object of this invention to provide an improved continuity test system for seismic operations in which very high resistance geophones are employed.

SUMMARY OF THE INVENTION

Briefly, the invention is in combination with seismic exploration wherein at least one very high resistance transducer is connected to a recording station from a transducer station via a signal conductor. There is included means for testing said signal conductor for continuity without interfering with deismic signals generated by said transducer. The testing means comprises means for providing a condutive path in parallel with said transducer at said transducer station, the said path is conductive only when a voltage greater than said seismic signals is applied.

Again briefly, the invention is in combination with seismic exploration wherein a plurality of crystal type hydrophones are connected together to form a group located at each of a plurality of transducer stations. There are also a plurality of signal conductors for connecting a recording station with each of said transducer stations, and means for testing said signal conductors to determine continuity thereof, from said recording station. The said last named means comprises a pair of zener diodes connected in series with opposite polarity and located at each of said transducer stations. Each of said pair of zener diodes is connected across each said group of hydrophones, and there is a constant current source located at said recording station for holding said pairs of zener diodes conductive when connected thereto. It also comprises a voltmeter connected across said constant current source for measuring the resistance of each of said signal conductors, and switching means for selectively connecting said constant current source and voltmeter to each of said signal conductors for testing same.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a schematic illustration of a marine type seismic operation with a cable extending from the stern of a seismic ship that is carrying out marine seismic operations;

FIG. 2 is a schematic circuit diagram illustrating the elements involved in the invention; and FIG. 3 is a circuit diagram illustrating a modified form of a unit of the invention.

DESCRIPTION OF THE PREFERRED EMBODIMENTS

As indicated by FIG. 1, the invention is particularly applicable to a marine-type seismic system. This is principally because marine seismic operations are those which employ a very high resistance type of transducer, i.e. they use crystal hydrophones, in detecting seismic energies which are being picked up for recording.

The illustrated type of seismic operation involves a seismic ship 11, that carries a reel 12 near the stern, upon which will be wound a cable 15 that includes signal conductors (indicated in FIG. 2) which make individual connections with a plurality of transducer stations 16. At the end of the cable 15, there is a tail bouy 19 which acts as a radar reflector.

The ship 11 also carries a sound source 20 that is schematically indicated. This is for creating seismic wave energies that are to be recorded as received by the transucers at transducer stations 16. The distances involved in such an operation are considerable. For example, the distance from the stern of the ship 11 to the first transducer station 16 is usually several hundred feet. This distance is indicated by a dimensional arrow 21. The length of a spread of the transducer stations 16 involves distances as great as several miles, and each group 16 of the transducers may involve five to twenty hydrophones in a group. Therefore, a typical length of each group is 25-100 meters. Consequently, it will be appreciated that the distributed resistance of the streamer cable involves from about 100 ohms to thousands of ohms. Typically, there may be 48-208 total groups of transducers.

The invention will be better understood with reference to FIGS. 2 and 3. FIG. 2 illustrates a pair of signal conductors 25 that are connected to a pair of switch terminals 26 which are located at a recording station 27. The recording station is, of course, located aboard the ship 11. These conductors 25 extend along and are part of the cable 15 which is illustrated in FIG. 1. Each pair of conductors, e.g. the conductors 25 reach from the recording station 27 to a transducer station 30 (indicated in FIG. 2) where a plurality of hydrophones, or transducers 31 are located. It will be understood that the transducer station 30 represents one of the transducer stations 16 that are indicated in FIG. 1.

Connected between the signal conductors 25, and in parallel with the hydrophones 31, there is a pair of oppositely poled zener diodes 34 and 35. These act to provide a conductive path (when zener voltage is exceeded) in parallel with the transducers 31, at the transducer station 30. They will provide the conditions of a conductive path at the desired time, in accordance with the explanation which follows.

It will be observed in FIG. 2 that there is a constant current source 38 which is located at the recording station 27, and it may take various forms. For example, there are constant current sources which are commercially available, e.g. models 6177C, 6181C, and 6186C manufactured by the Hewlett Packard Corporation. It will be understood by one skilled in the art that a less elaborate source of constant current would be quite suitable for a resistance tester, in accordance with the invention. Connected across the output of the constant current source 38 is a voltmeter 39 which will be calibrated in terms of the resistance, i.e. in ohms, in order to provide a measurement of the continuity of a circuit being tested.

It will be understood that a switch 42 is a multiple position type which has a pair of movable contactors 43 that are shown in contact with the terminals 26 described above. It also will be understood that the switch 42 may be shifted for selectively connecting the constant current source 38 to each of a plurality of transducer groups like the group of hydrophones 31 that make up the transducer station 30 in FIG. 2. This is a typical group and represents one of the transducer stations 16 (FIG. 1). Such stations are schematically indicated in FIG. 2 by the group 30 described above, and a plurality of additional groups (not shown) as indicated. The additional groups extend out to a last group 46.

Additional pairs of switch terminals 50 and 51 are schematically indicated. It will be understood that there is one pair of terminals for each transducer station, beginning with terminals 26 for station 30 and ending with a pair of terminals 52 for the station 46. Of course, there will also be a pair of unconnected terminals 53 for an off position of the switch 42.

It may be noted that each station of transducers, e.g. station 30 through station 46, has its individual pair of zener diodes such as the diodes 34 and 35 at station 30. Thus, at station 46 there is a similar pair of zener diodes 55 and 56.

It will be understood, also, that resistors 60 which are illustrated, represent the distributed resistance of the signal conductors 25.

It will be observed that there are conductors 63 and 64 illustrated. They are connected to the signal conductors 25 and to similar signal conductors 67 of the last channel. It will be understood, of course, that these conductors are located at the recording station 27, and that they connect the transducer group in each case with a recording system (not shown) which is indicated by the caption "To Recording System". It is located on the seismic ship 11 which contains the recording station 27.

OPERATION

It is to be noted that the system according to this invention is used for continuity testing of the signal conductors in a seismic system. It provides a means whereby a simple continuity test is possible even though crystal hydrophones are employed, which have such a high resistance that they are effectively an open circuit. Thus, when a continuity test is to be made, a particular signal conductor path is selected by the switch 42 and the constant current source 38 is connected to the signal conductor path selected, e.g. that including the conductors 25. The circuit selected goes via the distributed resistances 60 to the transducer station 30 where the hydrophones 31 are located. Then, by reason of having the constant current source 38 provide a voltage that is high enough to overcome the IR drops through the distributed resistances 60 and cause one of the zener diodes to conduct in its reverse direction, a continuity resistance reading may be taken.

It will be noted that the zener diodes 34 and 35 are selected so as to have such a reverse voltage breakdown characteristic that they will not conduct until a voltage level is reached which is well above the maximum amplitude of seismic signals generated by the hydrophones 31. For this reason, the diodes 34 and 35 will not interfere with the signals as they are generated at the transducers 31 during normal seismic operations.

When the continuity test is being made, the constant current source voltage will cause one of the zener diodes 34 or 35 to become reverse conducting, and by reason of being a constant current source, it will hold it in a conductive state so that the voltmeter 39 will then read in ohms the resistance that exists over the signal conductor path, i.e. via conductors 25, to and from the transducer station 30. Consequently, a break in this circuit, or a bad connection will be immediately detected and corrective action may be taken.

FIG. 3 illustrates a modification where instead of having the diodes both zener diodes, and with them polarized in opposite directions, there is one zener diode 70 and an ordinary diode 71 connected with its polarity in the opposite direction. It will be understood that the same effect can be obtained with the single zener diode 70 and the ordinary diode 71 polarized in the opposite directions, as indicated. However, it will be clear that the polarity of the voltage applied by the constant current source must be in the direction that the ordinary diode 71 will not block. With such a restriction, the system will operate in substantially the same manner as with the other modification, i.e. with two zener diodes. Thus, by having sufficient voltage to cause breakdown and accompanying conductive condition across the zener diode 70, the reading of continuity and resistance of the signal conductor path, may be taken as before.

While particular embodiments of the invention have been described above in considerable detail in accordance with the applicable statutes, this is not to be taken as in any way limiting the invention but merely as being descriptive thereof.

I claim:

1. In combination with seismic exploration wherein at least one very high resistance transducer is connected to a recording station from a transducer station via a signal conductor,
    means for testing said signal conductor for continuity without interfering with seismic signals generated by said transducer, comprising
    means for providing a conductive path in parallel with said transducer at said transducer station,
    said path being conductive only when a voltage greater than said seismic signals is applied.
2. The invention according to claim 1, wherein said conductive path means comprises at least one zener diode.

3. The invention according to claim 2, wherein said conductive path means comprises a pair of oppositely poled zener diodes.

4. The invention according to claim 2, wherein said testing means also comprises a constant current source for holding said zener diode conductive.

5. The invention according to claim 4, wherein said testing means also comprises a voltmeter for measuring the resistance of said signal conductor.

6. The invention according to claim 5, wherein there are a plurality of said very high resistance transducers at said transducer station.

7. The invention according to claim 6, wherein there are a plurality of said transducer stations, and switch means at said recording station for testing each of said transducer stations separately.

8. In combination with seismic exploration wherein a plurality of crystal type hydrophones are connected together to form a group located at each of a plurality of transducer stations, a plurality of signal conductors for connecting a recording station with each of said transducer stations, and means for testing said signal conductors to determine continuity thereof from said recording station, said last named means comprising a pair of zener diodes connected in series with opposite polarity and located at each of said transducer stations, each said pair of zener diodes being connected across each said group of hydrophones, a constant current source located at said recording station for holding said pairs of zener diodes conductive when connected thereto, a voltmeter connected across said constant current source for measuring the resistance of each of said signal conductors, and switching means for selectively connecting said constant current source and voltmeter to each of said signal conductors for testing same.

* * * * *